United States Patent
Maegawa

(10) Patent No.: US 11,231,277 B2
(45) Date of Patent: Jan. 25, 2022

(54) SENSOR DEVICE INCLUDING ANGULAR VELOCITY SENSOR ELEMENT AND ACCELERATION SENSOR ELEMENT

(71) Applicant: PANASONIC INTELLECTUAL PROPERTY MANAGEMENT CO., LTD., Osaka (JP)

(72) Inventor: Yuki Maegawa, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 27 days.

(21) Appl. No.: 16/825,968

(22) Filed: Mar. 20, 2020

(65) Prior Publication Data

US 2020/0300627 A1 Sep. 24, 2020

(30) Foreign Application Priority Data

Mar. 22, 2019 (JP) .............................. JP2019-055531

(51) Int. Cl.
*G01C 19/56* (2012.01)
*G01P 15/097* (2006.01)
*G01P 1/02* (2006.01)
*G01P 15/08* (2006.01)

(52) U.S. Cl.
CPC .............. *G01C 19/56* (2013.01); *G01P 1/023* (2013.01); *G01P 15/0888* (2013.01); *G01P 15/097* (2013.01)

(58) Field of Classification Search
CPC ........ G01P 1/02; G01P 1/023; G01P 15/0888; G01P 15/097; G01P 15/08; G01P 15/18; G01C 19/56
See application file for complete search history.

(56) References Cited

U.S. PATENT DOCUMENTS

| 6,040,625 A * | 3/2000 | Ip .............................. B81B 7/007 257/719 |
| 2011/0010924 A1* | 1/2011 | Berger ................ G01C 19/5783 29/592.1 |
| 2012/0318059 A1* | 12/2012 | Otsuki ................... H01L 23/057 73/504.12 |
| 2014/0008737 A1* | 1/2014 | Koduri ................ G01P 15/0802 257/415 |
| 2015/0300820 A1* | 10/2015 | Uchida ................. G01C 19/574 73/504.16 |
| 2016/0013112 A1* | 1/2016 | Ihle ......................... H01L 23/291 257/414 |
| 2017/0010135 A1* | 1/2017 | Hansen ................ B81C 1/00325 |
| 2017/0336436 A1* | 11/2017 | Maegawa ............. H05K 5/0078 |

FOREIGN PATENT DOCUMENTS

JP 2012063242 A 3/2012

* cited by examiner

*Primary Examiner* — Helen C Kwok
(74) *Attorney, Agent, or Firm* — McDermott Will and Emery LLP

(57) ABSTRACT

A sensor device includes an angular velocity sensor element, an acceleration sensor element, an intermediate member, and an elastic body. Both the angular velocity sensor element and the acceleration sensor element are mounted on the intermediate member. The elastic body is connected to the intermediate member and a fixing part located apart from the intermediate member. The intermediate member is configured to vibrate by receiving a vibration applied to the fixing part.

13 Claims, 13 Drawing Sheets

SENSOR DEVICE INCLUDING ANGULAR VELOCITY SENSOR ELEMENT AND ACCELERATION SENSOR ELEMENT

CROSS-REFERENCE TO RELATED APPLICATION

The present application is based upon and claims the benefit of priority of Japanese Patent Application No. 2019-055531, filed on Mar. 22, 2019, the entire contents of which are incorporated herein by reference.

TECHNICAL FIELD

The present disclosure relates to sensor devices, and specifically, to a sensor device including both an angular velocity sensor element and an acceleration sensor element.

BACKGROUND ART

JP 2012-63242 A discloses a device (sensor device) including an acceleration sensor element and an angular velocity sensor which are accommodated in a case made of ceramics. The acceleration sensor element is connected to a terminal electrode via a wire formed by wire bonding in a state where the acceleration sensor element is mounted on a multilayer circuit board in the case. Moreover, the angular velocity sensor is apart from the multilayer circuit board, and includes a terminal located between a mounting member including a vibrator and a reinforcing member made of a resin which attenuates an externally caused vibration.

In the case of the device disclosed in JP 2012-63242 A, however, the acceleration sensor element is mounted on the multilayer circuit board, whereas the angular velocity sensor is provided at a location away from the multilayer circuit board. That is, a location of a member on which the acceleration sensor element is provided is different from an installation location of the angular velocity sensor, and therefore, the structure of the sensor device is complicated and the size of the sensor device is likely to be increased.

SUMMARY

It is an object of the present disclosure to provide a sensor device configured to detect both an angular velocity and acceleration while a structure of the sensor device is simplified and a size of the sensor device is reduced.

A sensor device according to one aspect of the present disclosure includes: an angular velocity sensor element; an acceleration sensor element; an intermediate member; and an elastic body. Both the angular velocity sensor element and the acceleration sensor element are mounted on the intermediate member. The elastic body is connected to the intermediate member and a fixing part located apart from the intermediate member. The intermediate member is configured to vibrate by receiving a vibration applied to the fixing part.

DETAILED DESCRIPTION

First Embodiment

A sensor device 1 according to a first embodiment will be described with reference to FIGS. 1 to 6.

Figure 1:
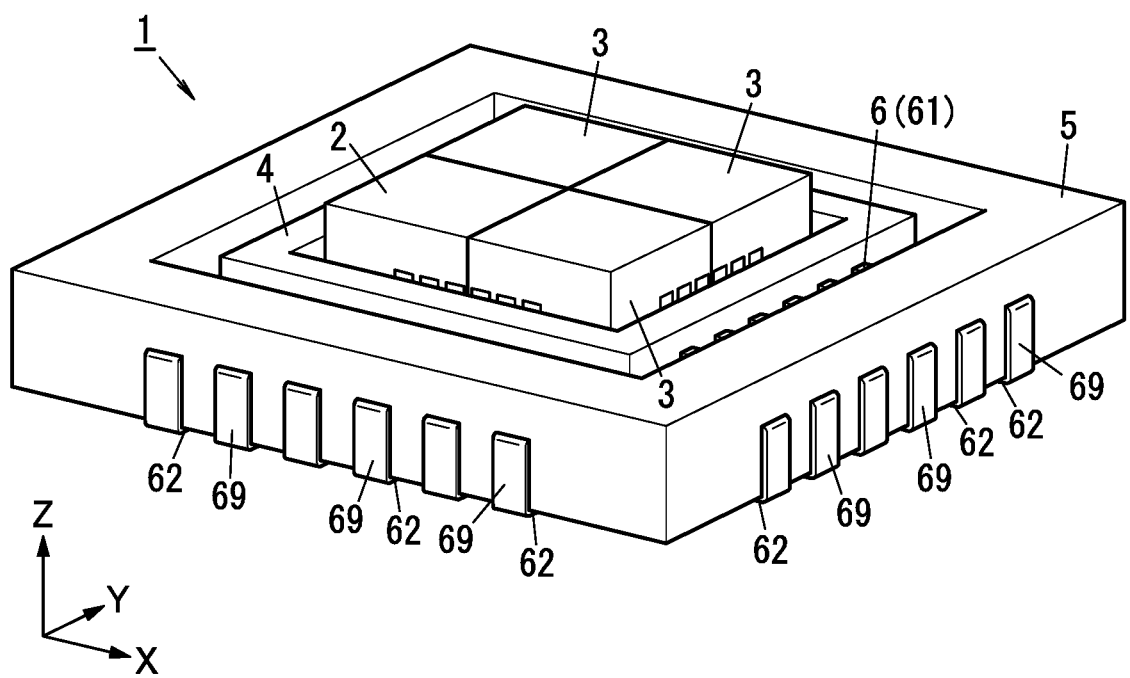
FIG. 1 is a perspective view illustrating a sensor device according to a first embodiment.
Figure 2:
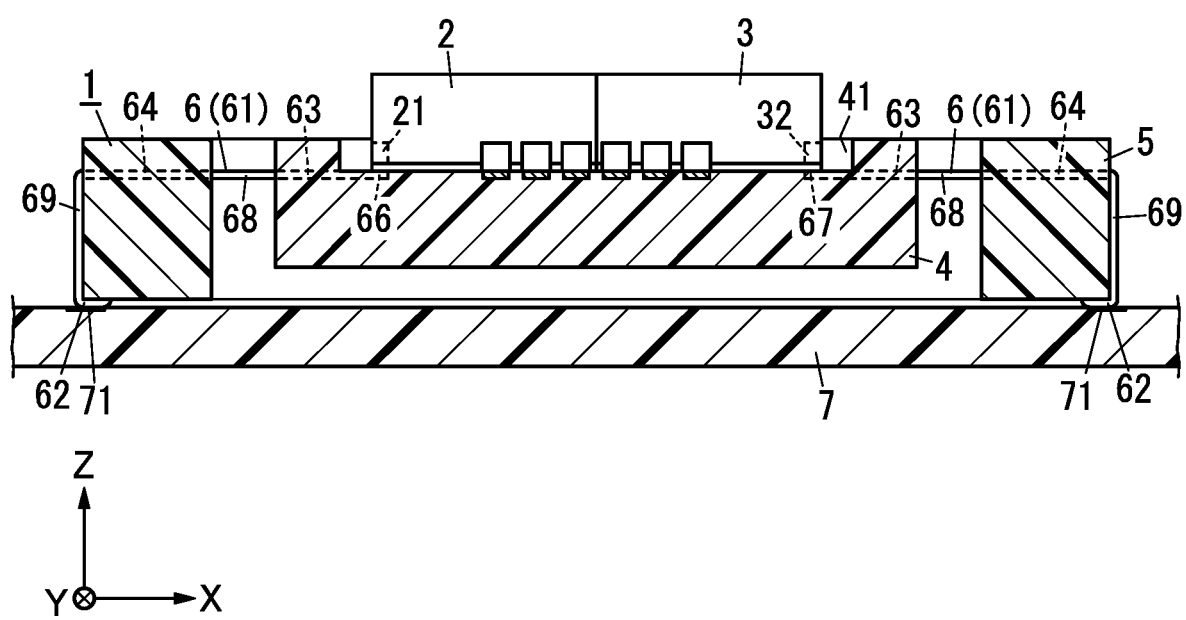
FIG. 2 is a sectional view illustrating the sensor device.

As illustrated in FIG. 1, the sensor device 1 includes an acceleration sensor element 2, angular velocity sensor elements 3, an intermediate member 4, and an elastic body 6. Both the angular velocity sensor elements 3 and the acceleration sensor element 2 are mounted on the intermediate member 4. As illustrated in FIG. 2, the elastic body 6 is connected to a fixing part 71 and the intermediate member 4. The fixing part 71 is located apart from the intermediate member 4. The intermediate member 4 vibrates by receiving vibration applied to the fixing part 71.

In the sensor device 1, both the angular velocity sensor elements 3 and the acceleration sensor element 2 are mounted on the intermediate member 4. This enables the structure of the sensor device 1 to be simplified and the size of the sensor device 1 to be reduced. In addition, the sensor device 1 is configured to detect both an angular velocity and acceleration with the simplified structure and the reduced size of the sensor device 1.

Next, the sensor device 1 according to the present embodiment will be described in further detail. In the following description, a direction in which the intermediate member 4 and the acceleration sensor element 2 are aligned with each other is referred to as a Z-axis direction, a direction orthogonal to the Z-axis direction is referred to as an X-axis direction, and a direction orthogonal to the X-axis direction is referred to as a Y-axis direction. Moreover, an axis parallel to the Z-axis direction may be a first axis, an axis parallel to the X-axis direction may be a second axis, and an axis parallel to the Y-axis direction may be a third axis.

As illustrated in FIG. 1, the sensor device 1 includes the acceleration sensor element 2, the plurality of angular velocity sensor elements 3, the intermediate member 4, a frame body 5, and the elastic body 6.

The acceleration sensor element 2 and the angular velocity sensor elements 3 are mounted on the intermediate member 4. The frame body 5 is a frame-like member located apart from an outer periphery of the intermediate member 4 in a plan view seen in the Z-axis direction. Here, the intermediate member 4 is rectangular in the plan view seen in the Z-axis direction. The frame body 5 has a rectangular frame shape slightly larger than the frame shape of the intermediate member 4 in the plan view seen in the Z-axis direction. In the plan view seen in the Z-axis direction, the intermediate member 4 is located in an interior space surrounded by the frame body 5.

As illustrated in FIG. 2, the elastic body 6 is connected to the fixing part 71 included in a substrate 7 and the intermediate member 4. The elastic body 6 is partially exposed between the intermediate member 4 and the frame body 5. The elastic body 6 has both ends one of which is located in the intermediate member 4 and the other of which is located in the frame body 5.

The elastic body 6 supports the intermediate member 4 at a location apart from the substrate 7 in the Z-axis direction. In a state where the intermediate member 4 is apart from the substrate 7, the elastic body 6 receives the vibration applied to the substrate 7 and repeats deformation and recovery to generate a vibration, thereby vibrating the intermediate member 4. That is, the intermediate member 4 vibrates following the vibration of the elastic body 6. For example, when a direction of the vibration of the elastic body 6 is parallel to the X-axis direction, the intermediate member 4 also vibrates parallel to the X-axis direction. When the direction of the vibration of the elastic body 6 is parallel to the Y-axis direction, the intermediate member 4 also vibrates parallel to the Y-axis direction. When the direction of the vibration of the elastic body 6 is parallel to the Z-axis direction, the intermediate member 4 also vibrates parallel to the Z-axis direction.

As illustrated in FIG. 1, the elastic body 6 includes a plurality of lead frames 61. In the example shown in FIG. 1, the elastic body 6 incudes only a plurality of (24) lead frames 61.

The lead frames 61 are members made of metal. The lead frames 61 are members formed by, for example, performing a cut process and a bending process on a metal plate. The metal plate is, for example, a copper plate. The lead frames 61 may be members obtained by performing a bending process on metal wires such as copper wires. Since the lead frames 61 are made of metal, the lead frames 61 are electrically connectable to the acceleration sensor element 2 and the angular velocity sensor elements 3.

Each lead frame 61 is connected to the fixing part 71 and the intermediate member 4 (see FIG. 2). That is, the plurality of lead frames 61 support the intermediate member 4 in a state where the intermediate member 4 is apart from the substrate 7 in the Z-axis direction. Each of the lead frames 61 includes a first connection part 63, an exposed part 68, a second connection part 64, a terminal 62, and a lead-out part 69.

Figure 3:
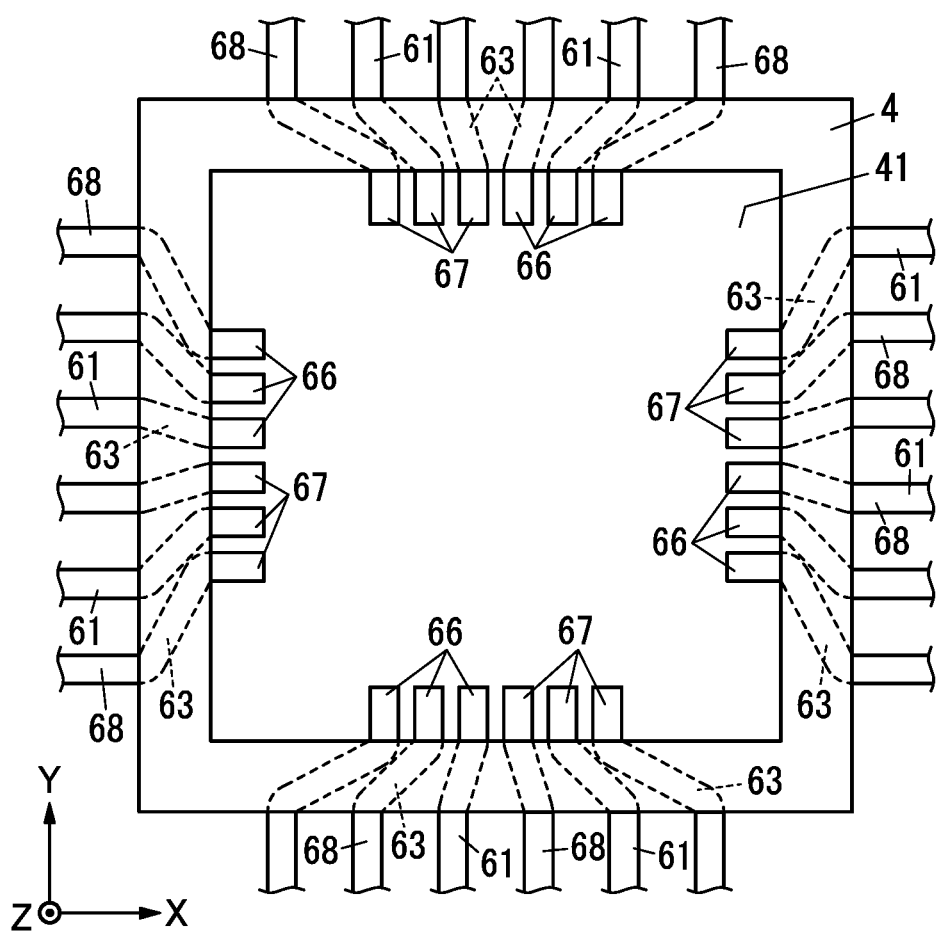
FIG. 3 is an illustrative view illustrating the sensor device.

As illustrated in FIG. 3, the first connection part 63 is a part located in the intermediate member 4 and is transverse to the X-axis direction and transverse to the Y-axis direction. The first connection part 63 is embedded in the intermediate member 4 by, for example, insert molding.

In a state where the plurality of first connection parts 63 are located in the intermediate member 4, an interval between each two adjacent first connection parts 63 aligned along one side of the intermediate member 4 increases from the center of the intermediate member 4 toward the outer periphery of the intermediate member 4. In the present embodiment, the outer periphery of the intermediate member 4 is rectangular. Thus, an interval between the first connection parts 63 adjacent to each other with a corner of the intermediate member 4 therebetween decreases from the center of the intermediate member 4 toward the outer periphery of the intermediate member 4.

The exposed part 68 is a part connecting the first connection part 63 to the second connection part 64 and is exposed between the frame body 5 and the intermediate member 4. The exposed part 68 is, in the present embodiment, located in a space between the frame body 5 and the intermediate member 4 and supports the intermediate member 4 at a location apart from the substrate 7 in the Z-axis direction (see FIG. 2). The exposed part 68 is exposed between the frame body 5 and the intermediate member 4, and therefore, when the frequency of a vibration applied to the fixing part 71 is higher than a natural frequency f1 which will be described later, a spring property of the exposed part 68 can attenuate the vibration of the intermediate member 4. In the present embodiment, the plurality of exposed parts 68 protrude from an outer side surface of the intermediate member 4 to be exposed and support the intermediate member 4 at a location apart from the substrate 7. Thus, the plurality of exposed parts 68 enable the vibration of the intermediate member 4 to be attenuated in each of the X-axis direction, Y-axis direction, and Z-axis direction when the frequency of the vibration applied to the fixing part 71 is higher than the natural frequency f1 which will be described later. In the example shown in FIG. 2, the exposed part 68 is linear.

As illustrated in FIG. 2, the second connection part 64 is a part connecting the exposed part 68 to the lead-out part 69 and is located in the frame body 5. The second connection part 64 is embedded in the frame body 5, by, for example, insert molding. The second connection part 64 is provided such that the intermediate member 4 is supported at a location apart from the substrate 7 in the Z-axis direction. The second connection part 64 is structured to have a linear cross section in the Z-axis direction. When the frame body 5 is made of a liquid crystal polymer which will be described later, the frame body 5 may have flexibility. When the frame body 5 has the flexibility, the second connection part 64 may contribute to attenuation of the vibration of the intermediate member 4.

The lead-out part 69 is a part of the lead frame 61, extend outside from an outer side surface of the frame body 5, and is in contact with the outer side surface of the frame body 5. The lead-out part 69 protrudes from a tip end of the second connection part 64 in a direction in which the acceleration sensor element 2 and the intermediate member 4 are aligned in this order (in a downward direction in FIG. 2). The lead-out part 69 is exposed (see FIGS. 1 and 2).

The terminal 62 is a part in contact with the fixing part 71 and protrudes from a tip end of the lead-out part 69 in the direction orthogonal to the Z-axis direction. The terminal 62 protrudes toward an interior of the frame body 5 in the direction orthogonal to the Z-axis direction. In the present embodiment, the terminal 62 is sandwiched between the fixing part 71 and the frame body 5 and is fixed to the fixing part 71. Thus, the sensor device 1 is positioned on the substrate 7. When the terminal 62 is fixed to the fixing part 71, any fixation method such as soldering may be adopted.

The lead frame 61 includes the lead-out part 69, and therefore, the fixing part 71 is easily connected to the lead frame 61. When soldering is adopted to connect the fixing part 71 to the lead frame 61, the lead-out part 69 is easily fixed to the fixing part 71 even if it is difficult to fix the terminal 62 to the fixing part 71. Thus, the fixing part 71 is easily connected to the lead frame 61.

As illustrated in FIG. 3, the intermediate member 4 is rectangular in the plan view seen in the Z-axis direction. In the example shown in FIG. 3, six lead frames 61 are provided at each side of the outer periphery of the intermediate member 4.

The acceleration sensor element 2 and the angular velocity sensor elements 3 are mounted on the intermediate member 4. The intermediate member 4 is a member holding electric pathways each connect any one of the acceleration sensor element 2 and the angular velocity sensor elements 3 to the fixing part 71. The intermediate member 4 is electrically insulating. The intermediate member 4 is integrated with the lead frame 61, more specifically, the first connection part 63 by insert molding. The intermediate member 4 is not particularly limited as long as it is made of a material usable in the insert molding. Examples of the material for the intermediate member 4 include resin materials such as a polyoxymethylene resin, a polybutylene terephthalate resin, a polyphenylene sulfide resin, and a liquid crystal polymer (specifically, total aromatic polyester).

Figure 7:
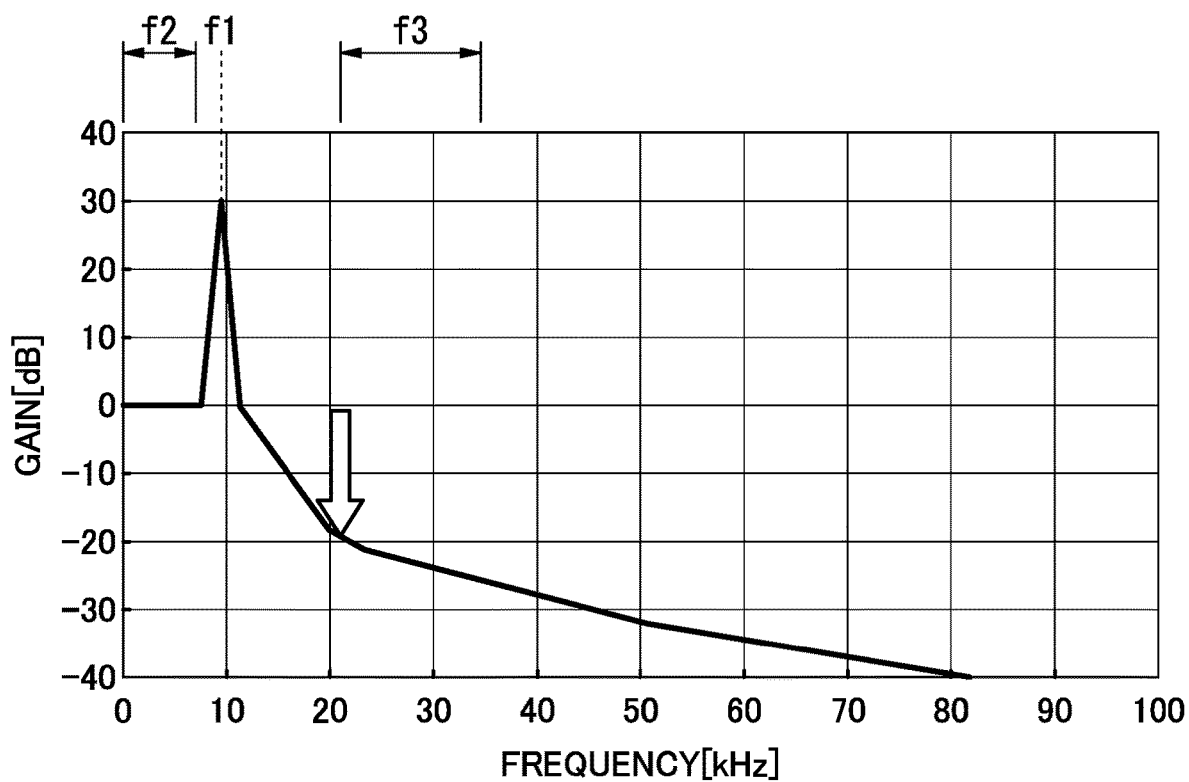
FIG. 7 is an illustrative view illustrating the sensor device.

The material for the intermediate member 4 may be a liquid crystal polymer. In this case, it is possible to impart heat resistance and vibration absorbency to the intermediate member 4, and formation burrs are less likely to be formed on the intermediate member 4. When the formation burrs are less likely to be formed on the intermediate member 4, it is possible to increase the dimensional accuracy of the intermediate member 4. When the intermediate member 4 has vibration absorbency, it is possible to easily adjust attenuation of the vibration of the intermediate member 4 (e.g., the attenuation characteristic shown in FIG. 7 is easily realized). Thus, the acceleration sensor element 2 can easily detect the acceleration, and each angular velocity sensor element 3 can easily detect the angular velocity. When the intermediate member 4 is heat-resistant, the intermediate member 4 is less likely to deform even in the case of Pb-free solder adopted for soldering to mount the acceleration sensor element 2 and the angular velocity sensor elements 3.

The intermediate member 4 includes a recess 41 having a bottom (see FIG. 2). The recess 41 is formed in an upper surface (a surface away from the substrate 7 in the Z-axis direction) of the intermediate member 4. The recess 41 is recessed in the Z-axis direction. The recess 41 is also rectangular in the plan view seen in the Z-axis direction. In the recess 41, the acceleration sensor element 2 and the angular velocity sensor elements 3 are mounted. In the example shown FIG. 1, a total of four sensor elements which are the acceleration sensor element 2 and the angular velocity sensor elements 3 are mounted in the recess 41. More specifically, in the recess 41, one acceleration sensor element 2 and three angular velocity sensor elements 3 are arranged.

The recess 41 has a bottom surface provided with a plurality of (in FIG. 3, three) first wires 66 and a plurality of (in FIG. 3, three) second wires 67 at each side of a peripheral edge of the recess 41. These first wires 66 are arranged at regular intervals along one side, and the second wires 67 are also arranged at regular intervals along the one side. The interval between a corner of the recess 41 and the first wire 66 is larger than the interval between each two adjacent first wires 66. The interval between a corner of the recess 41 and the second wire 67 is larger than the interval between each two adjacent second wires 67. The interval between each two adjacent first wires 66, the interval between the first wire 66 and the second wire 67 adjacent to each other, and the interval between each two adjacent second wires 67 are equal to each other.

The first wires 66 are made of metal. In the present embodiment, each first wire 66 is part of the lead frame 61. However, this should not be construed as limiting, but each first wire 66 may be separated from the lead frame 61. When the first wire 66 is separated from the lead frame 61, it is possible to form the first wire 66 on the bottom surface of the recess 41 by adopting any thin film formation method such as sputtering, and the first wire 66 is electrically connected to the lead frame 61.

The second wires 67 are made of metal. In the present embodiment, each second wire 67 is part of the lead frame 61. However, this should not be construed as limiting, but each second wire 67 may be separated from the lead frame 61. When the second wire 67 is separated from the lead frame 61, it is possible to form the second wire 67 on the bottom surface of the recess 41 by adopting any thin film formation method such as sputtering, and the second wire 67 is electrically connected to the lead frame 61.

In terms of the entirety of the outer periphery of the intermediate member 4, groups each including a plurality of (in FIG. 3, three) first wires 66 and groups each including a plurality of (in FIG. 3, three) second wires 67 are alternately arranged.

The frame body 5 is a frame-like member located apart from the outer periphery of the intermediate member 4. The frame body 5 is electrically insulating. The frame body 5 is integrated with the lead frames 61, more specifically, the second connection parts 64 by insert molding. When the frame body 5 is made of the same material as the intermediate member 4, the frame body 5 and the intermediate member 4 may be formed simultaneously.

The frame body 5 is not particularly limited as long as it is made of a material usable in the insert molding. Examples of the material for the frame body 5 include resin materials such as a polyoxymethylene resin, a polybutylene terephthalate resin, a polyphenylene sulfide resin, and a liquid crystal polymer (specifically, total aromatic polyester).

The material for the frame body 5 may be a liquid crystal polymer. In this case, it is possible to impart heat resistance and vibration absorbency (above-described flexibility) to the frame body 5, and formation burrs are less likely to be formed on the frame body 5. When the frame body 5 has the vibration absorbency, the frame body 5 can also attenuate the vibration of the intermediate member 4. In particular, also when the intermediate member 4 vibrates in a direction orthogonal to a direction in which the intermediate member 4 and the acceleration sensor element 2 are aligned, the frame body 5 can also attenuate the vibration. When the formation burrs are less likely to be formed on the frame body 5, it is possible to increase the dimensional accuracy of the frame body 5. When the frame body 5 has vibration absorbency, it is possible to easily adjust attenuation of the vibration of the intermediate member 4. Thus, the acceleration sensor element 2 can easily detect the acceleration, and the angular velocity sensor element 3 can easily detect the angular velocity. When the frame body 5 is heat-resistant, the frame body 5 is less likely to deform even in the case of Pb-free solder adopted for soldering to connect the terminal 62 to the fixing part 71. This enables the sensor device 1 to be mounted on the substrate 7.

Figure 4A:
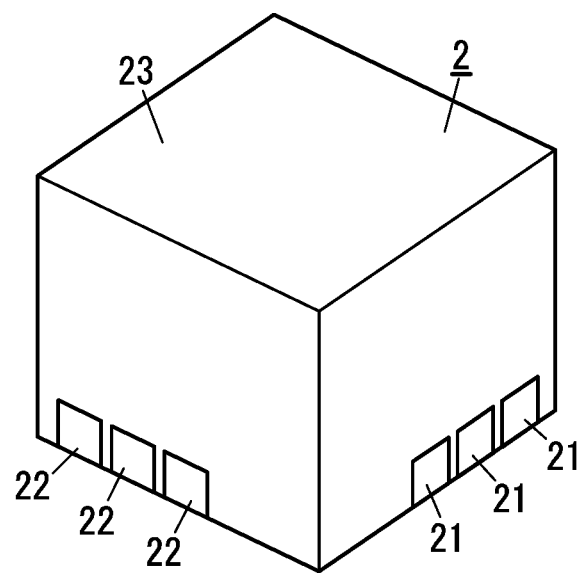
FIG. 4A is a perspective view illustrating an acceleration sensor element according to the first embodiment.
Figure 4B:
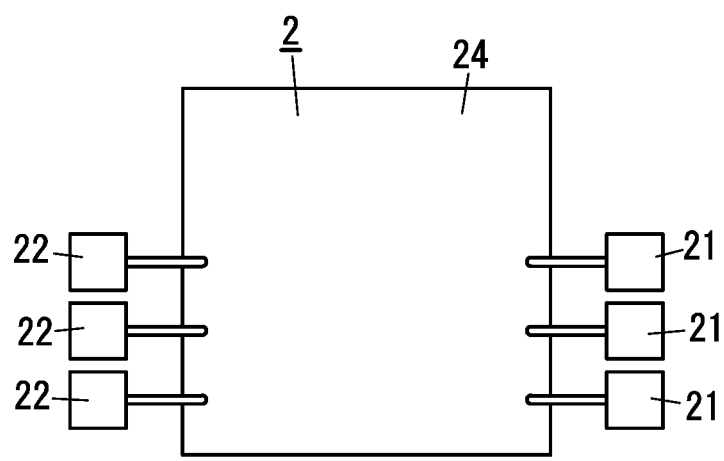
FIG. 4B is an illustrative view illustrating the acceleration sensor element.

The acceleration sensor element 2 is an element configured to detect acceleration applied to the sensor device 1. As illustrated in FIG. 4A, the acceleration sensor element 2 includes a case 23, first terminals 21, and second terminals 22. As illustrated in FIG. 4B, the acceleration sensor element 2 further includes a detector 24. The case 23 is part of an outer shell of the acceleration sensor element 2.

The first terminals 21 and the second terminals 22 are provided on an outer side surface of the case 23 such that each of the first terminals 21 is electrically connected to a corresponding one of the first wires 66, and each of the second terminals 22 is electrically connected to a corresponding one of the second wires 67. That is, the three first terminals 21 are connected to the three first wires 66 on a one-to-one basis, and the three second terminals 22 are connected to the three second wires 67 on a one-to-one basis. For example, the three first terminals 21 of the acceleration sensor element 2 are connected to the respective three first wires 66 in the recess 41 at a lower side in FIG. 3, and the three second terminals 22 of the acceleration sensor element 2 are connected to the respective three second wires 67 in the recess 41 at a left side in FIG. 3.

The detector 24 is electrically connected to the first terminals 21 and the second terminals 22 in a state where the detector 24 is accommodated in the case 23. When acceleration is applied to the sensor device 1, the detector 24 deforms, thereby causing a change of the electric resistance of the detector 24. The change amount of a current due to the change of the electric resistance is input as a signal detected by the acceleration sensor element 2 to a process device 8 which will be described later.

Figure 5A:
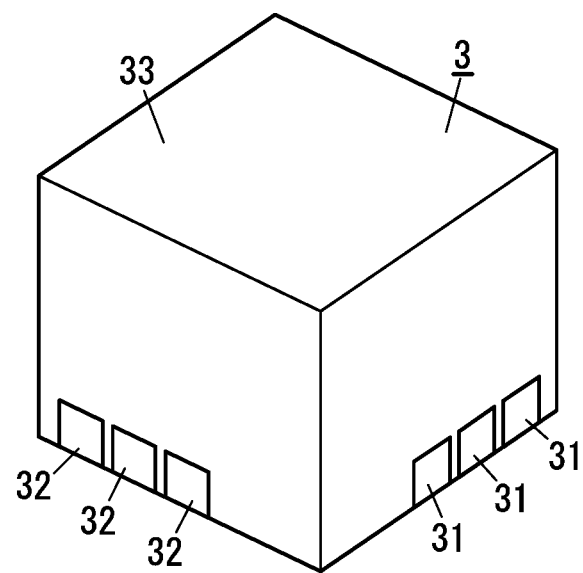
FIG. 5A is a perspective view illustrating an angular velocity sensor element according to the first embodiment.
Figure 5B:
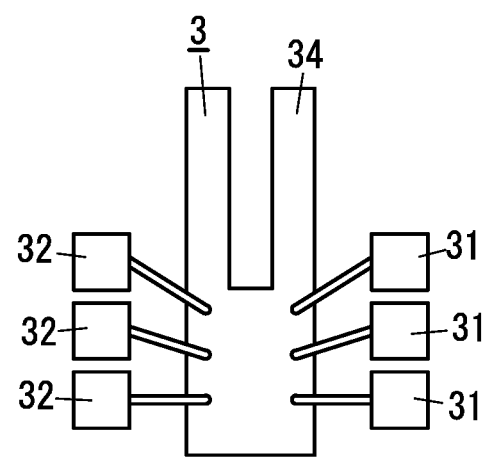
FIG. 5B is an illustrative view illustrating the angular velocity sensor element.

Each angular velocity sensor element 3 is an element configured to detect the angular velocity of the sensor device 1. Each angular velocity sensor element 3 is a vibration-type gyroscope sensor. As illustrated in FIG. 5A, each angular velocity sensor element 3 includes a case 33, first terminals 31, and second terminals 32. As illustrated in FIG. 5B, each angular velocity sensor element 3 further includes a vibrator 34. The case 33 is part of an outer shell of the angular velocity sensor element 3.

The first terminals 31 and the second terminals 32 are provided on an outer side surface of the case 33 such that each of the first terminals 31 is electrically connected to a corresponding one of the first wires 66, and each of the second terminals 32 is electrically connected to a corresponding one of the second wires 67. That is, the three first terminals 31 are connected to the three first wires 66 on a one-to-one basis, and the three second terminals 32 are connected to the three second wires 67 on a one-to-one basis.

For example, the three first terminals 31 of a first one of the angular velocity sensor elements 3 are connected to the respective three first wires 66 in the recess 41 at a left side in FIG. 3, and the three second terminals 32 of the first one of the angular velocity sensor elements 3 are connected to the respective three second wires 67 in the recess 41 at an upper side in FIG. 3. The three first terminals 31 of a second one of the angular velocity sensor elements 3 are connected to the respective three first wires 66 in the recess 41 at the upper side in FIG. 3, and the three second terminals 32 of the second one of the angular velocity sensor elements 3 are connected to the respective three second wires 67 in the recess 41 at a right side in FIG. 3. The three first terminals 31 of a third one of the angular velocity sensor elements 3 are connected to the respective three first wires 66 in the recess 41 at the right side in FIG. 3, and the three second terminals 32 of the second one of the angular velocity sensor elements 3 are connected to the respective three second wires 67 in the recess 41 at the lower side in FIG. 3.

The vibrator 34 is electrically connected to the first terminals 31 and the second terminals 32 in a state where the vibrator 34 is accommodated in the case 33. The vibrator 34 is, for example, a vibrator having a tuning fork shape.

The vibrator 34 has a pair of arms. The arms flex at a natural drive frequency due to electric power from the first terminal 31 and the second terminal 32, thereby driving (vibrating) the vibrator 34. When the sensor device 1 rotates about an axis parallel to the longitudinal direction (e.g., Z-axis direction) of the arms while the vibrator 34 is driven, Coriolis force proportional to the angular velocity of this rotation acts on the arms of the vibrator 34. An electric charge generated in the vibrator 34 due to the Coriolis force is input as a signal detected by the angular velocity sensor elements 3 to the process device 8 which will be described later. The Coriolis force acts in a direction orthogonal to a direction in which the arms flex while the vibrator 34 is driven. Thus, a detection direction of the angular velocity by the angular velocity sensor elements 3 is orthogonal to a drive direction of the vibrator 34. The vibrator 34 may adopt any structure as long as it flexes at a natural drive frequency and detects the angular velocity.

When the sensor device 1 is to detect angular velocities in the X-axis direction, the Y-axis direction, and the Z-axis direction, three angular velocity sensor elements 3 are mounted on the intermediate member 4, for example, such that the longitudinal direction of the arms of the three angular velocity sensor elements 3 are parallel to the X-axis direction, the Y-axis direction, and the Z-axis direction.

The fixing part 71 is a part electrically connected to a circuit (conductor) provided on the substrate 7 and determines a location to which the sensor device 1 is to be fixed. The fixing part 71 is made of metal and serves as an electrode of the sensor device 1. The number of the fixing parts 71 may be equal to the number of lead frames 61. That is, one lead frame 61 may be connected to one fixing part 71. Moreover, the fixing part 71 is part of the substrate 7 in the present embodiment, but may be separated from the substrate 7. When the fixing part 71 is separated from the substrate 7, mounting a terminal member including the fixing part 71 on the substrate 7 enables the fixing part 71 to be electrically connected to a circuit of the substrate 7. An example of the substrate 7 is a printed wiring board.

Figure 6:
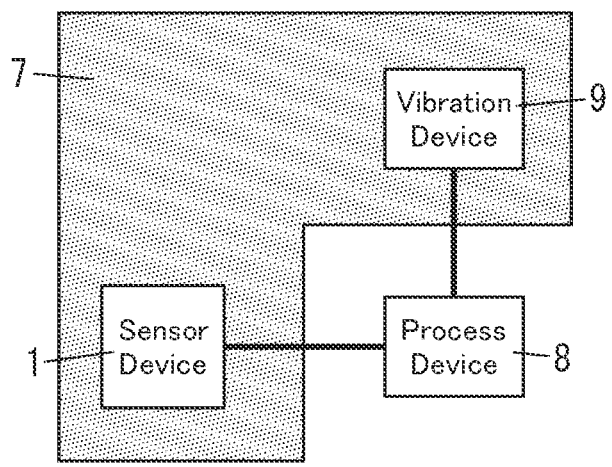
FIG. 6 is an illustrative view illustrating the sensor device.

Moreover, as illustrated in FIG. 6, the sensor device 1 is electrically connected to the process device 8, and the process device 8 is electrically connected to a vibration gauge 9. The process device 8 is at least electrically connected to the sensor device 1 and the vibration gauge 9, may be mounted on the substrate 7 or may be mounted on a substrate other than the substrate 7.

In the example shown in FIG. 6, the vibration gauge 9 is mounted on the substrate 7. The vibration gauge 9 is a device configured to detect a frequency when the substrate 7 vibrates and the amplitude of the vibration. Any vibration gauge may be used as the vibration gauge 9 as long as it can be mounted on the substrate 7.

The process device 8 is a device configured to process a signal detected by the acceleration sensor element 2 to obtain acceleration and configured to process a signal detected by the angular velocity sensor element 3 to obtain an angular velocity. Moreover, the process device 8 is a device configured to determine, from the oscillation frequency detected by the vibration gauge 9, a frequency corresponding to the natural frequency (characteristic frequency) $f1$ (see FIG. 7) of the sensor device 1. The process device 8 includes, for example, a central processing unit (CPU) and memory. In this case, the CPU executes a program in the memory. Thus, the process device 8 is configured to process a detection signal of the acceleration sensor element 2 at a frequency lower than the natural frequency $f1$ to obtain acceleration, and to process a detection signal of the angular velocity sensor element 3 at a frequency higher than the natural frequency $f1$ to obtain the angular velocity.

When vibration is applied to the substrate 7, the vibration is propagated via the fixing part 71 and the elastic body 6 to the intermediate member 4. That is, the intermediate member 4 vibrates by receiving the vibration applied to the fixing part 71. As illustrated in FIG. 7, the vibration of the intermediate member 4 attenuates such that the amplitude decreases as the frequency increases at a frequency higher than the natural frequency f1, whereas the vibration of the intermediate member 4 does not attenuate at a frequency f2 lower than the natural frequency f1. Such an attenuation characteristic is realized mainly by the structure of the elastic body 6 (lead frame 61) and optionally by vibration absorbency of the intermediate member 4 and the frame body 5.

The natural frequency f1 is a natural frequency of the sensor device 1 obtained when the intermediate member 4 once receives an externally applied vibration (external vibration) to cause a vibration of the intermediate member 4 and thereafter the intermediate member 4 receives no external vibration.

When the intermediate member 4 continues receiving the external vibration and the phase of the external vibration matches the phase of the vibration of the intermediate member 4, the intermediate member 4 resonates at the natural frequency f1, which increases the amplitude of the intermediate member 4 as illustrated in FIG. 7.

Here, the "gain" shown along the ordinate in FIG. 7 is a value proportional to a common logarithm of a ratio of the amplitude of the intermediate member 4 to the amplitude of the external vibration (e.g., variation applied to the substrate 7). The amplitude and the frequency of the external vibration are detected by the vibration gauge 9. Note that the amplitude and the frequency when the intermediate member 4 vibrates are detectable by any non-contact-type vibration gauge.

As described above, the vibration of the intermediate member 4 attenuates at a frequency higher than the natural frequency f1. Thus, at the frequency higher than the natural frequency f1, the vibration applied from the substrate 7 to the angular velocity sensor element 3 also attenuates, and thereby, driving and detecting of the vibrator 34 become less likely to be disturbed. Accordingly, at a frequency higher than the natural frequency f1, the vibration of the intermediate member 4 is less likely to interfere with detection of the angular velocity by the angular velocity sensor element 3. When the vibration of the intermediate member 4 no longer interferes with the detection of the angular velocity, it is possible to increase the detection accuracy of the angular velocity by the angular velocity sensor element 3.

The vibration of the intermediate member 4 at a frequency higher than the natural frequency f1 preferably satisfies the relationship described by formula (1) below.

[Formula 1]

$$1 / \sqrt{\left\{1-\left(\frac{\omega_g}{\omega_0}\right)^2\right\}^2 + \left(2\zeta \frac{\omega_g}{\omega_0}\right)^2} < A \quad (1)$$

In formula (1), $\omega_g$ is the drive frequency of the vibrator 34 in the angular velocity sensor element 3, $\omega_0$ is the natural frequency f1, and $\zeta$ is a damping ratio. The damping ratio $\zeta$ is a physical property value of a material forming each of the intermediate member 4 and the frame body 5. When the material is a liquid crystal polymer, the damping ratio $\zeta$ is, for example, greater than or equal to 0.001 and less than or equal to 0.02. Moreover, "A" in formula (1) is an attenuation ratio which is a ratio at which the vibration of the intermediate member 4 attenuates, and the attenuation ratio is specifically a ratio of the amplitude of the intermediate member 4 to the amplitude of the external vibration.

The drive frequency $\omega_g$ of the vibrator 34 is set to a frequency f3 higher than the natural frequency f1 as shown in FIG. 7. An attenuation ratio "A" which results in the frequency f3 is preferably lower than or equal to $10^{-0.75}$. That is, the gain is preferably lower than or equal to −15 dB. In this case, interference with driving and detection of the vibrator 34 is further reduced, and thus, it is possible to increase the detection accuracy of the angular velocity. The arrow in FIG. 7 shows a preferable lower limit value of the drive frequency $\omega_g$.

When the vibration of the intermediate member 4 attenuates, it becomes possible to drive the vibrator 34 in a direction orthogonal to a detection direction of the angular velocity (direction in which the Coriolis force acts). In this case, the vibration of the intermediate member 4 does not interfere with the driving of the vibrator 34, and therefore, it is possible to increase the accuracy of detecting the angular velocity.

As described above, the intermediate member 4 is integrated with the plurality of lead frames 61, and each of the lead frames 61 includes the exposed part 68. Thus, when the frequency of the external vibration is higher than the natural frequency f1, the vibration of the intermediate member 4 is reduced and attenuates in each of the X-axis direction, the Y-axis direction, and the Z-axis direction due to the spring characteristics of the plurality of exposed parts 68. Accordingly, the vibration of the intermediate member 4 is less likely to interfere with detection of the angular velocity by the angular velocity sensor element 3. That is, the vibration of the intermediate member 4 is less likely to interfere with detection of the angular velocity by the angular velocity sensor element 3 at each of the three axes orthogonal to one another. Thus, it is possible to obtain the angular velocity of each of the X-axis direction, the Y-axis direction, and the Z-axis direction, and thereby, the detection accuracy of the angular velocity can be increased.

To detect the angular velocity of each of the X-axis direction, the Y-axis direction, and the Z-axis direction, the frequency B may be divided into three types of drive frequencies $\omega_g$. That is, three drive frequencies $\omega_g$ different from one another may be set for the three angular velocity sensor elements 3. That is, the frequency B may be divided into a first drive frequency $\omega_{g1}$, a second drive frequency $\omega_{g2}$, and a third drive frequency $\omega_{g3}$. The first drive frequency $\omega_{g1}$ is a frequency at which the vibrator 34 flexes and is driven in the X-axis direction, and the first drive frequency $\omega_{g1}$ is, for example, higher than or equal to 22 Hz and lower than or equal to 24 Hz. The second drive frequency $\omega_{g2}$ is a frequency at which the vibrator 34 flexes and is driven in the Y-axis direction, and the second drive frequency $\omega_{g2}$ is, for example, higher than or equal to 23 Hz and lower than or equal to 26 Hz. The third drive frequency $\omega_{g3}$ is a frequency at which the vibrator 34 flexes and is driven in the Z-axis direction, and the third drive frequency $\omega_{g3}$ is, for example, higher than or equal to 28 Hz and lower than or equal to 32 Hz.

As described above, at the frequency f2 shown in FIG. 7, the vibration of the intermediate member 4 does not attenuate. This is because the vibration of the intermediate member 4 resonates with the external vibration at the frequency f2. When the vibration of the intermediate member 4 does not attenuate, the vibration applied to the acceleration sensor element 2 also does not attenuate, and therefore, force deforming the detector 24 is less likely to be reduced by the vibration, so that interference with detection of acceleration by the detector 24 is reduced. Accordingly, at the frequency f2, the vibration of the intermediate member 4 is less likely to interfere with detection of the acceleration by the acceleration sensor element 2. When the vibration of the intermediate member 4 no longer interferes with the detection of the acceleration, it is possible to increase the detection accuracy of the acceleration by the acceleration sensor element 2. The detector 24 has, for example, a sheet shape. Moreover, the detector 24 may adopt any structure that detects acceleration.

The vibration of the intermediate member 4 at the frequency f2 preferably satisfies the relationship indicated by formula (2) below.

[Formula 2]

$$1 \Big/ \sqrt{\left\{1-\left(\frac{\omega_a}{\omega_0}\right)^2\right\}^2 + \left(2\zeta\frac{\omega_a}{\omega_0}\right)^2} \cong 1 \qquad (2)$$

In formula (2), $\omega_a$ is a response frequency in the acceleration sensor element 2, $\omega_0$ is the natural frequency f1, and $\zeta$ is the damping ratio.

Here, the response frequency $\omega_a$ is a frequency at which the detector 24 deforms to give a response. The response frequency is the frequency f2. Thus, force deforming the detector 24 is less likely to be reduced by the vibration, and thus, it is possible to increase the detection accuracy of the acceleration.

Moreover, as described above, at the frequency f2, the intermediate member 4 vibrates in resonance with the phase of the external vibration. Thus, when the frequency of the external vibration is the frequency f2, the vibration of the intermediate member 4 does not attenuate in each of the X-axis direction, the Y-axis direction, and the Z-axis direction. Accordingly, the vibration of the intermediate member 4 is less likely to interfere with detection of the acceleration by the acceleration sensor element 2. That is, the vibration of the intermediate member 4 is less likely to interfere with detection of the acceleration by the acceleration sensor element 2 at each of the three axes orthogonal to one another. Thus, it is possible to obtain the acceleration in each of the X-axis direction, the Y-axis direction, and the Z-axis direction, and thereby, the detection accuracy of the acceleration can be increased.

To detect the acceleration in each of the X-axis direction, the Y-axis direction, and the Z-axis direction, any three-axis acceleration sensor element may be adopted as the acceleration sensor element 2.

Second Embodiment

Next, with reference to FIGS. 8 and 9, a sensor device 1 according to a second embodiment will be described. In the present embodiment, components common to the first embodiment are denoted by the same reference signs as those in the first embodiment, and the detailed description thereof will be omitted.

Figure 8:
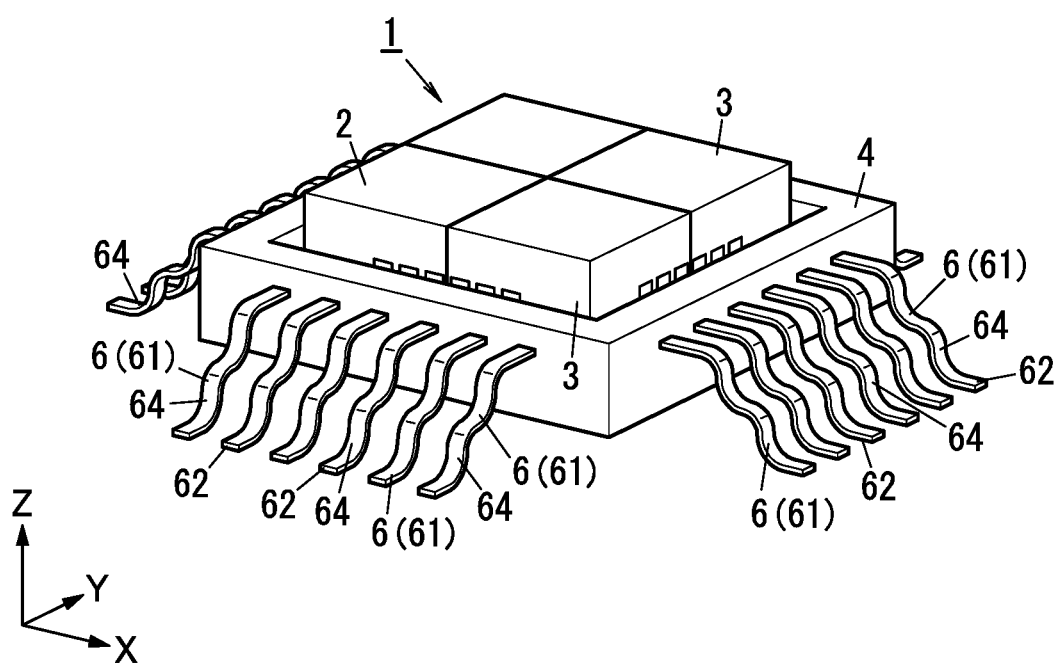
FIG. 8 is a perspective view illustrating a sensor device according to a second embodiment.

The sensor device 1 does not include the frame body 5 shown in FIG. 1 (see FIG. 8). Thus, some parts, specifically, an exposed part 68, a second connection part 64, and a terminal 62, of an elastic body 6 are exposed. Moreover, the elastic body 6 does not include the lead-out part 69 as shown in FIG. 1. That is, lead frames 61 do not include the lead-out parts 69 (see FIG. 9).

Figure 9:
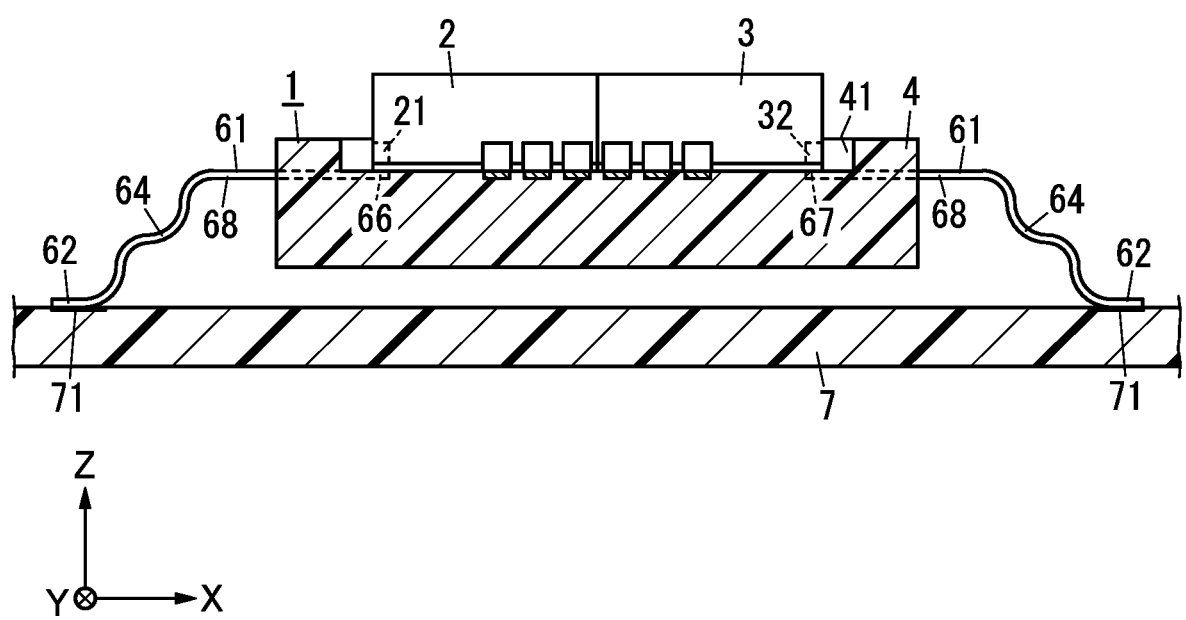
FIG. 9 is a sectional view illustrating the sensor device according to the second embodiment.

As illustrated in FIG. 9, the second connection part 64 is a part that connects the exposed part 68 to the terminal 62. The second connection part 64 is tilted between the exposed part 68 and the terminal 62 when the sensor device 1 is viewed in the Y-axis direction. The distance between the exposed part 68 and the terminal 62 is set such that an intermediate member 4 is apart from a substrate 7 in the Z-axis direction. The second connection part 64 is structured to have a wave-shaped cross section in the Z-axis direction.

The terminal 62 is a part in contact with a fixing part 71 and protrudes from a tip end of the second connection part 64 in a direction orthogonal to the Z-axis direction. In the present embodiment, the terminal 62 is fixed to the fixing part 71. Thus, the sensor device 1 is positioned on the substrate 7. When the terminal 62 is fixed to the fixing part 71, any fixation method such as soldering may be adopted.

Since the sensor device 1 does not include the frame body 5, the terminal 62 is easily fixed to the fixing part 71 by soldering or the like as illustrated in FIG. 9. In addition, cost required for the frame body 5 (e.g., material cost) can be reduced. Thus, cost required for manufacturing the sensor device 1 can be reduced.

In the present embodiment, the exposed part 68 and the second connection part 64 are exposed, and therefore, when the intermediate member 4 vibrates at a frequency higher than a natural frequency f1, spring characteristics of the exposed part 68 and the second connection part 64 enable a vibration of the intermediate member 4 to be attenuated. In particular, it is possible to attenuate the vibration of the intermediate member 4 in each of the X-axis direction, the Y-axis direction, and the Z-axis direction.

Moreover, at a frequency f2 lower than the natural frequency f1, the intermediate member 4 causes the vibration in resonance with an external vibration, and therefore, the vibration of the intermediate member 4 does not attenuate.

Third Embodiment

Next, with reference to FIGS. 10 to 13, a sensor device 1 according to a third embodiment will be described. In the present embodiment, components common to the first embodiment are denoted by the same reference signs as those in the first embodiment, and the detailed description thereof will be omitted.

Figure 10:
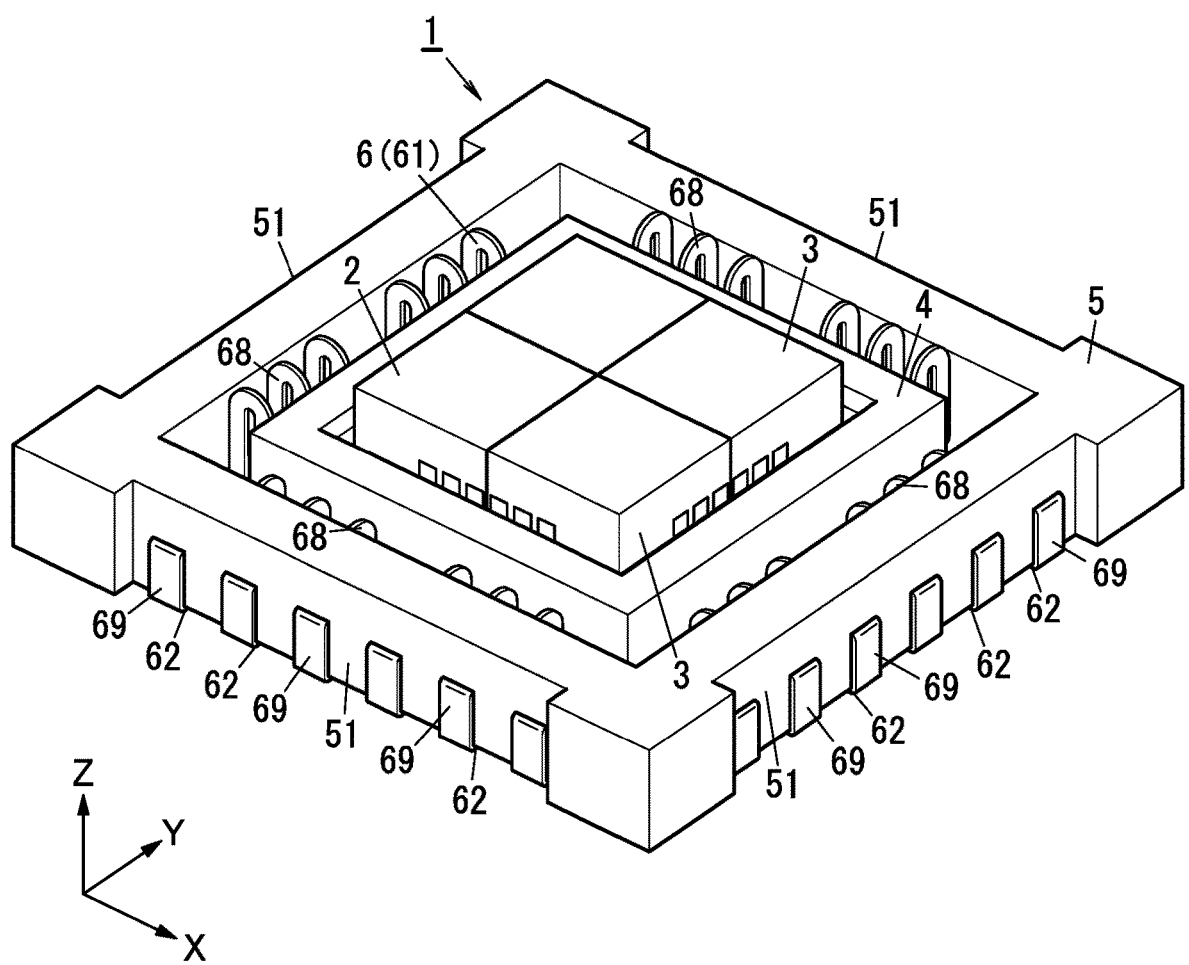
FIG. 10 is a perspective view illustrating a sensor device according to a third embodiment.

As illustrated in FIG. 10, the sensor device 1 according to the present embodiment includes an acceleration sensor element 2, a plurality of angular velocity sensor elements 3, an intermediate member 4, a frame body 5, and an elastic body 6.

The elastic body 6 includes a plurality of lead frames 61. Each of the lead frames 61 includes a first connection part 63, an exposed part 68, a terminal 62, and a lead-out part 69 (see FIGS. 10 and 12). The lead frame 61 further includes a second connection part. The second connection part preferably connects the lead-out part 69 to the exposed part 68. The second connection part may have any structure. For example, the cross section of the second connection part may be wave-shaped or linear in the Z-axis direction.

The frame body 5 has a plurality of (in FIG. 10, four) recesses 51. Each of the recesses 51 has such a shape that an outer side surface of the frame body 5 is recessed toward the intermediate member 4. The outer side surface of the frame body 5 located in each recess 51 is provided with the plurality of lead-out parts 69. Each of the lead-out parts 69 is in contact with the outer side surface of the frame body 5. In the example shown in FIG. 10, six lead-out parts 69 are provided per recess 51.

As illustrated in FIG. 10, the exposed part 68 is exposed between the frame body 5 and the intermediate member 4. The exposed part 68 preferably connects the first connection part 63 to the second connection part.

Figure 11:
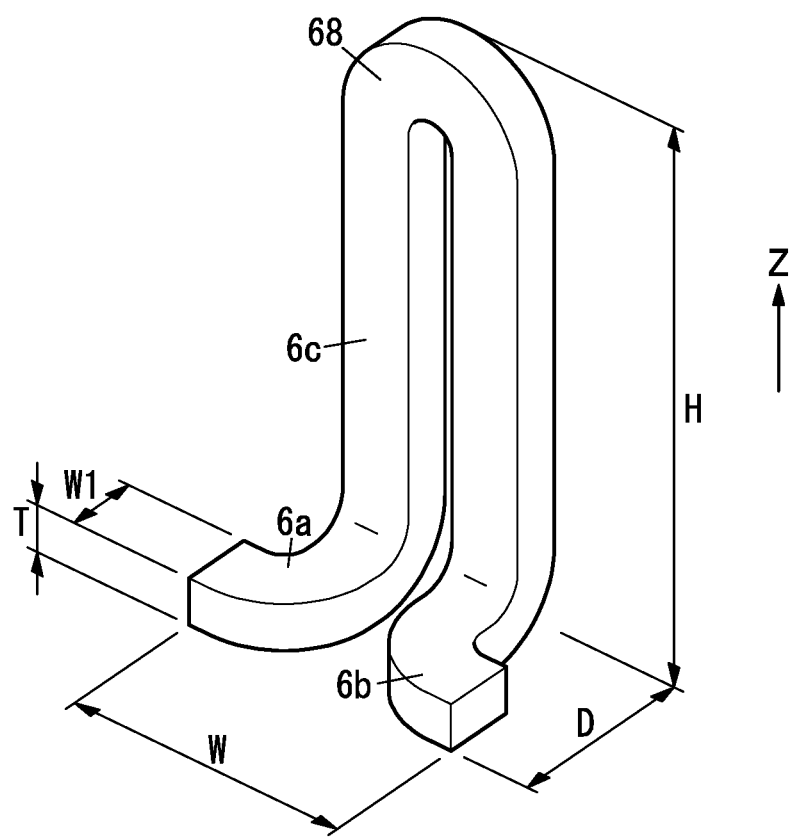
FIG. 11 is an illustrative view illustrating the sensor device according to the third embodiment.

As illustrated in FIG. 11, the exposed part 68 includes a first spring 6a, a second spring 6b, and a third spring 6c.

The third spring 6c is located between the intermediate member 4 and the frame body 5 and is apart from both the intermediate member 4 and the frame body 5. The third spring 6c is structured to have a U-shaped cross section protruding along a direction in which the intermediate member 4 and the acceleration sensor element 2 are aligned in this order (see FIG. 11). Of the third spring 6c, a part apart from the first spring 6a and the second spring 6b in the Z-axis direction is defined as an upper end, and in this case, at only the upper end, a part connected to the first spring 6a is integrated with a part connected to the second spring 6b. Thus, the third spring 6c has a spring characteristic that acts in a direction orthogonal to the Z-axis direction. The third spring 6c includes a first end and a second end. The first end is apart from the second end in the direction orthogonal to the Z-axis direction.

The first spring 6a protrudes from the first end of the third spring 6c in the direction (e.g., X-axis direction) orthogonal to the Z-axis direction and protrudes in a lateral direction of the third spring 6c to be further apart from the second spring 6b. Thus, the first spring 6a is orthogonal to the Z-axis direction.

The second spring 6b protrudes from the second end of the third spring 6c in the direction (e.g., X-axis direction) orthogonal to the Z-axis direction and protrudes in a lateral direction of the third spring 6c to be further apart from the first spring 6a. Thus, the second spring 6b is orthogonal to the Z-axis direction.

The first spring 6a and the second spring 6b are both orthogonal to the Z-axis direction and thus have spring characteristics which act in the Z-axis direction.

The exposed part 68 includes the first spring 6a, the second spring 6b, and the third spring 6c, and the vibration of the intermediate member 4 in each of the X-axis direction, the Y-axis direction, and the Z-axis direction can resonate at a frequency lower than a natural frequency f1 and can be attenuated at a frequency higher than the natural frequency f1.

As illustrated in FIG. 11, the exposed part 68 has a width W, a depth D, and a height H. In the example shown in FIG. 11, the directions parallel to the Z-axis direction are upward and downward directions, and a direction in which the first spring 6a protrudes from the first end of the third spring 6c is the front direction. In this case, the depth D is a distance between a front end surface of the exposed part 68 and a rear surface of the third spring 6c. Moreover, the height H is a distance between a lower end face of the exposed part 68 and an upper end surface of the third spring 6c. The width W is equal to a distance between the intermediate member 4 and the frame body 5.

Figure 12:
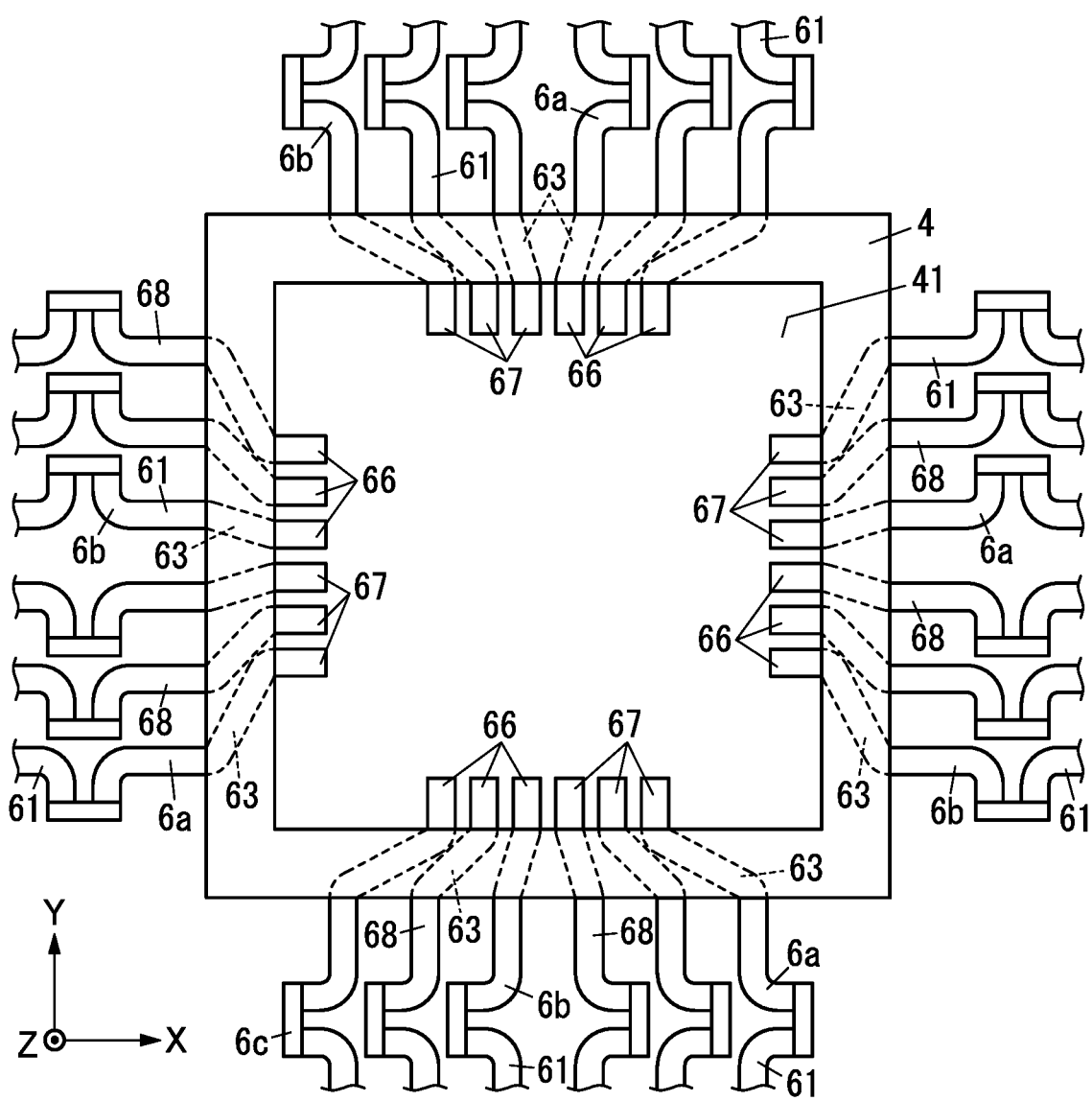
FIG. 12 is an illustrative view illustrating the sensor device according to the third embodiment.

In the present embodiment, as illustrated in FIG. 12, the plurality of (e.g., 24) exposed parts 68 protrude from an outer side surface of the intermediate member 4 to be exposed. The outer periphery of the intermediate member 4 is provided with the same number of a plurality of exposed parts 68 per side. Specifically, in the example shown in FIG. 12, six exposed parts 68 are provided at one side of the outer periphery of the intermediate member 4. Since the intermediate member 4 is provided with the plurality of exposed parts 68 per side, the vibration of the intermediate member 4 in each of the X-axis direction, the Y-axis direction, and the Z-axis direction can resonate at a frequency lower than a natural frequency f1 and can be attenuated at a frequency higher than the natural frequency f1 (see FIG. 13).

Figure 13:
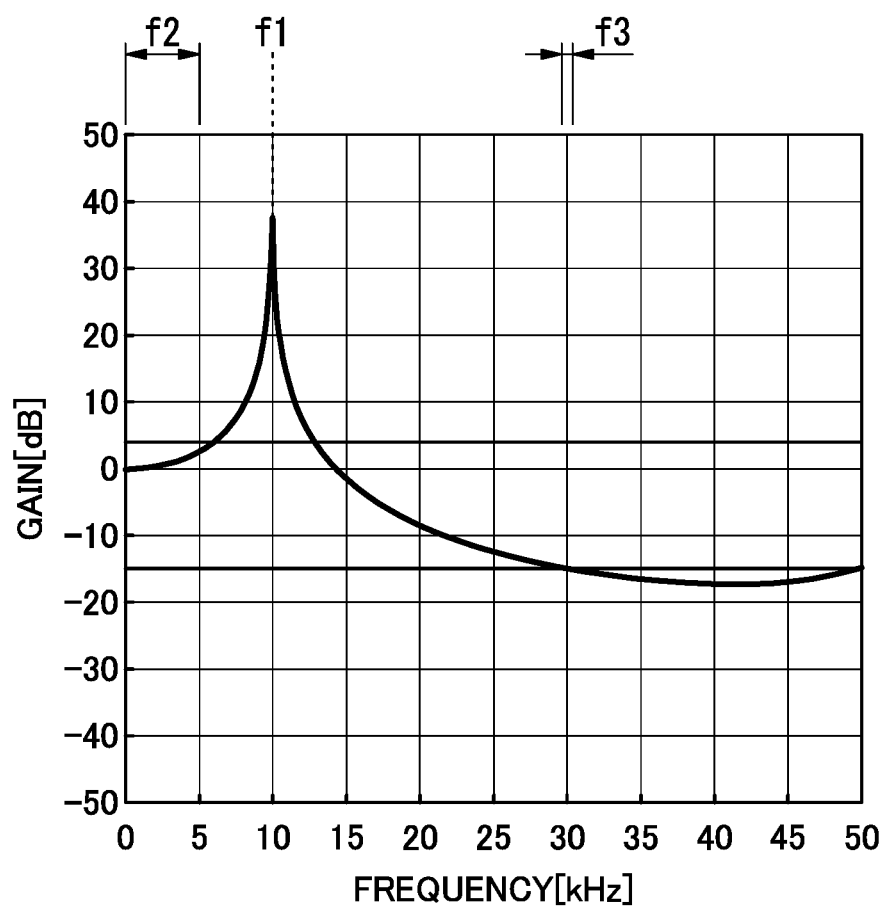
FIG. 13 is an illustrative view illustrating the sensor device according to the third embodiment.

FIG. 13 shows a simulation result obtained by giving, in the Z-axis direction, external vibration of each frequency to the sensor device 1 according to the present embodiment. The simulation result shows a relationship between the frequency of the external vibration and the gain (a value proportional to a common logarithm of a ratio of the amplitude of the intermediate member 4 to the amplitude of the external vibration) in a curved line. Note that the result shown in FIG. 13 is one example of the present embodiment and does not specifically limit the present disclosure.

From the result shown in FIG. 13, at a frequency f3 higher than the natural frequency f1, the gain is preferably less than −15 dB, that is, the vibration of the intermediate member 4 preferably satisfies the relationship described by formula (3) below.

[Formula 3]

$$1 \Big/ \sqrt{\left\{1-\left(\frac{\omega_g}{\omega_0}\right)^2\right\}^2 + \left(2\zeta\frac{\omega_g}{\omega_0}\right)^2} < 10^{-0.75} \qquad (3)$$

When the vibration of the intermediate member 4 satisfies the relationship described by formula (3), the vibration of the intermediate member 4 attenuates at the frequency f3, and therefore, the vibration of the intermediate member 4 is less likely to interfere with the detection of the angular velocity by the angular velocity sensor element 3. This enables the detection accuracy of the angular velocity to be increased.

Moreover, at a frequency f2 lower than the natural frequency f1, the gain is preferably less than or equal to 3 dB, that is, the vibration of the intermediate member 4 preferably satisfies the relationship described by formula (4) below.

[Formula 4]

$$1 < 1 \Big/ \sqrt{\left\{1-\left(\frac{\omega_a}{\omega_0}\right)^2\right\}^2 + \left(2\zeta\frac{\omega_a}{\omega_0}\right)^2} \le 10^{0.15} \qquad (4)$$

When the vibration of the intermediate member 4 satisfies the relationship described by formula (4), the vibration of the intermediate member 4 does not attenuate at the frequency f2, and therefore, the vibration of the intermediate member 4 is less likely to interfere with the detection of the acceleration by the acceleration sensor element 2. This enables the detection accuracy of the acceleration to be increased.

Note that in order to obtain the simulation result shown in FIG. 13, parameters indicated below were used.
  Width×depth of frame body 5=9 mm×9 mm,
  Material of frame body 5: liquid crystal polymer,
  Width×depth of intermediate member 4=5.9 mm×5.9 mm,
  Material of intermediate member 4: liquid crystal polymer,
  Thickness T of exposed part 68 (thickness of each of first spring 6a, second spring 6b, and third spring 6c)=0.07 mm, Width W1 of each of first spring 6a, second spring 6b, and third spring 6c=0.14 mm,
Material of exposed part 68: stainless steel (SUS304),
Height H of exposed part 68=0.6 mm,
Depth D of exposed part 68=0.4 mm.

Variation

In the above-described embodiments, the elastic body 6 includes only the plurality of lead frames 61, but in a variation, the elastic body 6 may further include a spring member having any shape other than the lead frames 61. Examples of the spring member include a coil spring.

In the above-described embodiments, some lead frames 61 of the plurality of lead frames 61 are electrically connected to the acceleration sensor element 2, and remaining lead frames 61 are electrically connected to the angular velocity sensor elements 3. However, in a variation, the sensor device 1 may further include a lead frame 61 which is electrically connected to neither the acceleration sensor element 2 nor the angular velocity sensor element 3. That is, the angular velocity sensor elements 3 and the acceleration sensor element 2 are electrically connected to at least some of the plurality of lead frames 61.

In the above-described embodiments, the planar shape of the intermediate member 4 is rectangular when viewed in a direction in which the intermediate member 4 and the acceleration sensor element 2 are aligned, but in a variation, the planar shape of the intermediate member 4 may be any shape such as an ellipse.

In the above-described embodiments, four sensor elements including the acceleration sensor element 2 and the angular velocity sensor elements 3 are mounted on the intermediate member 4, but in a variation, five or more sensor elements may be mounted on the intermediate member 4. Specifically, six sensor elements including three acceleration sensor elements 2 and three angular velocity sensor elements 3 may be mounted on the intermediate member 4. The three acceleration sensor elements 2 include a 1-axis acceleration sensor element configured to detect acceleration in the X-axis direction, a 1-axis acceleration sensor element configured to detect acceleration in the Y-axis direction, and a 1-axis acceleration sensor element configured to detect acceleration in the Z-axis direction. Moreover, the three angular velocity sensor elements 3 include a 1-axis angular velocity sensor element configured to detect an angular velocity in the X-axis direction, a 1-axis angular velocity sensor element configured to detect an angular velocity in the Y-axis direction, and a 1-axis angular velocity sensor element configured to detect an angular velocity in the Z-axis direction.

In the first embodiment, the second connection part 64 connects the exposed part 68 to the lead-out part 69, but in a variation, the second connection part 64 may connect the exposed part 68 to the terminal 62. In the variation, when the sensor device 1 is viewed in the Y-axis direction, the second connection part 64 is preferably tilted between the exposed part 68 and the terminal 62. The distance between the exposed part 68 and the terminal 62 is preferably set such that an intermediate member 4 is apart from a substrate 7 in the Z-axis direction. The cross section of the second connection part 64 may be wave-shaped or linear in the Z-axis direction.

Summary

As described above, a sensor device (1) of a first aspect includes: an angular velocity sensor element (3); an acceleration sensor element (2); an intermediate member (4); and an elastic body (6). Both the angular velocity sensor element (3) and the acceleration sensor element (2) are mounted on the intermediate member (4). The elastic body (6) is connected to the intermediate member (4) and a fixing part (71) located apart from the intermediate member (4). The intermediate member (4) is configured to vibrate by receiving a vibration applied to the fixing part (71).

With the first aspect, both the angular velocity sensor element (3) and the acceleration sensor element (2) are mounted on the intermediate member (4). This enables the structure of the sensor device (1) to be simplified and the size of the sensor device (1) to be reduced. In addition, the sensor device (1) is configured to detect both an angular velocity and acceleration with the simplified structure and the reduced size of the sensor device (1).

In a sensor device (1) of a second aspect referring to the first aspect, a vibration of the intermediate member (4) at a frequency higher than the natural frequency (f1) causes no interference with detection of an angular velocity by the angular velocity sensor element (3).

With the second aspect, detection accuracy of the angular velocity by the angular velocity sensor element (3) can be increased.

In a sensor device (1) of a third aspect referring to the second aspect, the vibration of the intermediate member (4) attenuates at the frequency higher than the natural frequency (f1).

With the third aspect, the vibration of the intermediate member (4) attenuates at a prescribed frequency, and thus, interference with the detection of the angular velocity by the angular velocity sensor element (3) is reduced, and therefore, it is possible to increase the detection accuracy of the angular velocity.

In a sensor device (1) of a fourth aspect referring to the second or third aspect, the angular velocity sensor element (3) includes a vibrator (34). The vibrator (34) is configured to be driven in a direction orthogonal to a detection direction of the angular velocity at the frequency higher than the natural frequency (f1).

With the fourth aspect, the vibration of the intermediate member (4) causes no interference with the driving of the vibrator (34), and therefore, it is possible to increase the accuracy of detecting the angular velocity.

In a sensor device (1) of a fifth aspect referring to any one of the second to fourth aspects, the vibration of the intermediate member (4) satisfies a relationship described by formula (1):

[Formula 5]

$$1 \Big/ \sqrt{\left\{1-\left(\frac{\omega_g}{\omega_0}\right)^2\right\}^2 + \left(2\zeta\frac{\omega_g}{\omega_0}\right)^2} < A \quad (1)$$

In formula (1), $\omega_g$ denotes a drive frequency in the acceleration sensor element (2), $\omega_0$ denotes the natural frequency (f1), $\zeta$ denotes a damping ratio, and A denotes an attenuation ratio which is a ratio at which the vibration of the intermediate member (4) attenuates.

The fifth aspect enables the structure of the sensor device (1) to be simplified and the size of the sensor device (1) to be reduced. In addition, the sensor device (1) is configured to detect both an angular velocity and acceleration with the simplified structure and the reduced size of the sensor device (1).

In a sensor device (1) of a sixth aspect referring to any one of the second to fifth aspects, the vibration of the intermediate member (4) causes no interference with detection of the angular velocity by the angular velocity sensor element (3) at each of three axes orthogonal to one another.

With the sixth aspect, it is possible to obtain the angular velocity of each of the three axes, and thereby, the detection accuracy of the angular velocity can be increased.

In a sensor device (1) of a seventh aspect referring to any one of the first to sixth aspects, the vibration of the intermediate member (4) at a frequency lower than the natural frequency (f1) causes no interference with detection of acceleration by the acceleration sensor element (2).

With the seventh aspect, detection accuracy of acceleration by the acceleration sensor element (2) can be increased.

In a sensor device (1) of an eighth aspect referring to the seventh aspect, the vibration of the intermediate member (4) does not attenuate at the frequency lower than the natural frequency (f1).

With the eighth aspect, the vibration of the intermediate member (4) no longer attenuates at a prescribed frequency, and thus, interference with the detection of the acceleration by the acceleration sensor element (2) is reduced, and therefore, it is possible to increase the detection accuracy of the acceleration.

In a sensor device (1) of a ninth aspect referring to the seventh or eighth aspect, the vibration of the intermediate member (4) satisfies a relationship described by formula (2):

[Formula 6]

$$1 \bigg/ \sqrt{\left\{1 - \left(\frac{\omega_a}{\omega_0}\right)^2\right\}^2 + \left(2\zeta\frac{\omega_a}{\omega_0}\right)^2} \cong 1 \quad (2)$$

In formula (2), $\omega_a$ denotes a response frequency in the acceleration sensor element (2), $\omega_0$ denotes the natural frequency (f1), and $\zeta$ denotes a damping ratio.

The ninth aspect enables the structure of the sensor device (1) to be simplified and the size of the sensor device (1) to be reduced. In addition, the sensor device (1) is configured to detect both an angular velocity and acceleration with the simplified structure and the reduced size of the sensor device (1).

In a sensor device (1) of a tenth aspect referring to any one of the seventh to ninth aspects, the vibration of the intermediate member (4) causes no interference with the detection of the acceleration by the acceleration sensor element (2) at each of three axes orthogonal to one another.

With the tenth aspect, it is possible to obtain the acceleration of each of the three axes, and thereby, the detection accuracy of the acceleration can be increased.

In a sensor device (1) of a eleventh aspect referring to any one of the first to tenth aspects, the elastic body (6) includes a plurality of lead frames (61). The plurality of lead frames (61) are connected to the fixing part (71) and the intermediate member (4).

The eleventh aspect enables the structure of the sensor device (1) to be simplified and the size of the sensor device (1) to be reduced. In addition, the sensor device (1) is configured to detect both an angular velocity and acceleration with the simplified structure and the reduced size of the sensor device (1).

In a sensor device (1) of a twelfth aspect referring to the eleventh aspect, the angular velocity sensor element (3) and the acceleration sensor element (2) are electrically connected to at least some of the plurality of lead frames (61).

The twelfth aspect enables the structure of the sensor device (1) to be simplified and the size of the sensor device (1) to be reduced. In addition, the sensor device (1) is configured to detect both an angular velocity and acceleration with the simplified structure and the reduced size of the sensor device (1).

In a sensor device (1) of a thirteenth aspect referring to any one of the first to twelfth aspects, the elastic body (6) supports the intermediate member (4) such that the vibration of the intermediate member (4) attenuates at a frequency higher than a natural frequency (f1) and the vibration of the intermediate member (4) does not attenuate at a frequency (f2) lower than the natural frequency (f1).

With the thirteenth aspect, the vibration of the intermediate member (4) attenuates at a prescribed frequency (a frequency higher than the natural frequency f1), and thus, interference with the detection of the angular velocity by the angular velocity sensor element (3) is reduced, and therefore, it is possible to increase the detection accuracy of the angular velocity. In addition, the vibration of the intermediate member (4) no longer attenuates at the frequency (f2) which is prescribed, and thus, interference with the detection of the acceleration by the acceleration sensor element (2) is reduced, and therefore, it is possible to increase the detection accuracy of the acceleration.

In a sensor device (1) of a fourteenth aspect referring to the thirteenth aspect, the angular velocity sensor element (3) includes a vibrator (34). The vibrator (34) is configured to be driven at a drive frequency (f3) higher than the natural frequency (f1).

With the fourteenth aspect, the vibration of the intermediate member (4) causes no interference with the driving of the vibrator (34), and therefore, it is possible to increase the accuracy of detecting the angular velocity.

The invention claimed is:

1. A sensor device, comprising:
   an angular velocity sensor element;
   an acceleration sensor element;
   an intermediate member on which both the angular velocity sensor element and the acceleration sensor element are mounted;
   an elastic body connected to the intermediate member and a fixing part located apart from the intermediate member, the elastic body including a plurality of lead frames each having electric conductivity; and
   a support body in which the plurality of lead frames are partially embedded,
   the intermediate member being configured to vibrate by receiving a vibration applied to the fixing part,
   each of the lead frame including:
      a terminal to be connected to the fixing part, and
      a lead-out part extending from the terminal, the lead-out part extending along and abutting a side face of the support body.

2. The sensor device of claim 1, wherein
   a vibration of the intermediate member at a frequency higher than a natural frequency causes no interference with detection of an angular velocity by the angular velocity sensor element.

3. The sensor device of claim 2, wherein
   the vibration of the intermediate member attenuates at the frequency higher than the natural frequency.

4. The sensor device of claim 2, wherein
   the angular velocity sensor element includes a vibrator, and
   the vibrator is configured to be driven in a direction orthogonal to a detection direction of the angular velocity at the frequency higher than the natural frequency.

5. The sensor device of claim 2, wherein
the vibration of the intermediate member satisfies a relationship described by formula (1):

[Formula 1]

$$1 \Big/ \sqrt{\left\{1 - \left(\frac{\omega_g}{\omega_0}\right)^2\right\}^2 + \left(2\zeta\frac{\omega_g}{\omega_0}\right)^2} < A \qquad (1)$$

where $\omega_g$ denotes a drive frequency in the angular velocity sensor element, $\omega_0$ denotes the natural frequency, $\zeta$ denotes a damping ratio, and A denotes an attenuation ratio which is a ratio at which the vibration of the intermediate member attenuates.

6. The sensor device of claim 2, wherein
the vibration of the intermediate member causes no interference with detection of the angular velocity by the angular velocity sensor element at each of three axes orthogonal to one another.

7. The sensor device of claim 1, wherein
a vibration of the intermediate member at a frequency lower than a natural frequency causes no interference with detection of an acceleration by the acceleration sensor element.

8. The sensor device of claim 7, wherein
the vibration of the intermediate member does not attenuate at the frequency lower than the natural frequency.

9. The sensor device of claim 7, wherein
the vibration of the intermediate member satisfies a relationship described by formula (2):

[Formula 2]

$$1 \Big/ \sqrt{\left\{1 - \left(\frac{\omega_a}{\omega_0}\right)^2\right\}^2 + \left(2\zeta\frac{\omega_a}{\omega_0}\right)^2} \cong 1 \qquad (2)$$

where, $\omega_a$ denotes a response frequency in the acceleration sensor element, $\omega_0$ denotes the natural frequency, and $\zeta$ denotes a damping ratio.

10. The sensor device of claim 7, wherein
the vibration of the intermediate member causes no interference with the detection of the acceleration by the acceleration sensor element at each of three axes orthogonal to one another.

11. The sensor device of claim 1, wherein
the angular velocity sensor element and the acceleration sensor element are electrically connected to at least some of the plurality of lead frames.

12. The sensor device of claim 1, wherein
the elastic body supports the intermediate member such that a vibration of the intermediate member attenuates at a frequency higher than a natural frequency and the vibration of the intermediate member does not attenuate at a frequency lower than the natural frequency.

13. The sensor device of claim 12, wherein
the angular velocity sensor element includes a vibrator, and
the vibrator is configured to be driven at a drive frequency higher than the natural frequency.

* * * * *